United States Patent
Nobori

(10) Patent No.: US 11,048,463 B2
(45) Date of Patent: Jun. 29, 2021

(54) METHOD FOR CONTROLLING DISPLAY SYSTEM, DISPLAY SYSTEM, AND DISPLAY APPARATUS

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/798,815

(22) Filed: Feb. 24, 2020

(65) Prior Publication Data

US 2020/0272405 A1 Aug. 27, 2020

(30) Foreign Application Priority Data

Feb. 25, 2019 (JP) .............................. JP2019-031326

(51) Int. Cl.
*G06F 3/14* (2006.01)
*H04N 21/431* (2011.01)
*G06F 3/0484* (2013.01)

(52) U.S. Cl.
CPC .......... *G06F 3/1454* (2013.01); *G06F 3/0484* (2013.01); *H04N 21/4312* (2013.01)

(58) Field of Classification Search
None
See application file for complete search history.

(56) References Cited

U.S. PATENT DOCUMENTS

| 6,940,528 B2* | 9/2005 | Fukui | G06F 3/011 345/634 |
| 2011/0122147 A1* | 5/2011 | Yasukawa | H04N 9/3179 345/589 |
| 2015/0277844 A1* | 10/2015 | Kubota | H04N 9/3179 345/2.1 |
| 2016/0188274 A1* | 6/2016 | Chen | G06F 3/04886 345/2.1 |
| 2016/0337689 A1* | 11/2016 | Yoshimura | H04W 76/14 |

FOREIGN PATENT DOCUMENTS

| JP | H09-018846 A | 1/1997 |
| JP | 2015-194982 A | 11/2015 |

* cited by examiner

*Primary Examiner* — Christopher J Kohlman
(74) *Attorney, Agent, or Firm* — Oliff PLC

(57) ABSTRACT

A method for controlling a display system is a method for controlling a display system including a first terminal, a second terminal, and a display apparatus that displays an image on a screen, and the method includes transmitting first transmission data representing a first image from the first terminal to the display apparatus and transmitting second transmission data representing a second image from the second terminal to the display apparatus. In a case where the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

15 Claims, 7 Drawing Sheets

METHOD FOR CONTROLLING DISPLAY SYSTEM, DISPLAY SYSTEM, AND DISPLAY APPARATUS

The present application is based on, and claims priority from JP Application Serial Number 2019-031326, filed Feb. 25, 2019, the disclosure of which is hereby incorporated by reference herein in its entirety.

BACKGROUND

1. Technical Field

The present disclosure relates to a display system, a method for controlling the display system, and a display apparatus.

2. Related Art

JP-A-9-18846 discloses an inter-multipoint communication apparatus that writes a plurality of sets of image data received from a plurality of terminals in a memory and displays images read from the memory and further discloses a technology for conveying the reception capability of the apparatus to each of the terminals.

In the technology described in JP-A-9-18846, however, when the number of terminals increases, the resultant increase in communication traffic causes a tight network band condition, resulting in a possibility of a decrease in quality of a displayed image.

SUMMARY

A first aspect is directed to a method for controlling a display system including a first terminal, a second terminal, and a display apparatus that displays an image on a screen, the method including transmitting first transmission data representing a first image from the first terminal to the display apparatus and transmitting second transmission data representing a second image from the second terminal to the display apparatus, and when the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

A second aspect is directed to the first aspect, in which the display apparatus controls the first and second terminals by transmitting first information that defines an image quality of the first image to the first terminal and transmitting second information that defines an image quality of the second image to the second terminal.

A third aspect is directed to the second aspect, in which the first information and the second information each contain at least one of three types of parameter, a frame rate, resolution, and a compression rate.

A fourth aspect is directed to any of the first to third aspects, in which the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

A fifth aspect is directed to the fourth aspect, in which the display apparatus moves the first and second images relative to the display area in according with a user's operation.

A sixth aspect is directed to a display system including a first terminal, a second terminal, and a display apparatus that displays an image on a screen. The first terminal transmits first transmission data representing a first image to the display apparatus. The second terminal transmits second transmission data representing a second image to the display apparatus. In a case where the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

A seventh aspect is directed to the sixth aspect, in which the display apparatus controls the first and second terminals by transmitting first information that defines an image quality of the first image to the first terminal and transmitting second information that defines an image quality of the second image to the second terminal.

An eighth aspect is directed to the seventh aspect, in which the first information and the second information each contain at least one of three types of parameter, a frame rate, resolution, and a compression rate.

A ninth aspect is directed to any of the sixth to eighth aspects, in which the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

A tenth aspect is directed to the ninth aspect, in which the display apparatus moves the first and second images relative to the display area in according with a user's operation.

An eleventh aspect is directed to a display apparatus including a display instrument that displays an image on a screen, a communication interface that receives first transmission data transmitted from a first terminal and representing a first image and second transmission data transmitted from a second terminal and representing a second image, and a control circuit that controls at least one of the first and second terminals in such a way that the first transmission data has a larger communication traffic volume than the second transmission data when the first image is displayed on the screen based on the first transmission data but the second image is not displayed on the screen based on the second transmission data.

A twelfth aspect is directed to the eleventh aspect, in which the control circuit controls the first and second terminals by transmitting first information that defines an image quality of the first image to the first terminal via the communication interface and transmitting second information that defines an image quality of the second image to the second terminal via the communication interface.

A thirteenth aspect is directed to the twelfth aspect, in which the first information and the second information each contain at least one of three types of parameter, a frame rate, resolution, and a compression rate.

A fourteenth aspect is directed to any of the eleventh to thirteenth aspects, and the display apparatus further includes an image generating circuit that generates integrated image data based on the first transmission data and the second transmission data, part of the integrated image data defining a display area displayed in correspondence with the screen, and the integrated image data representing the first and second images mapped in positions shifted from each other, and the display instrument displays the first image on the screen based on the integrated image data.

A fifteenth aspect is directed to the fourteenth aspect, in which the display apparatus further includes an input instrument that accepts a user's operation, and the control circuit moves the first and second images relative to the display area in accordance with the operation.

DESCRIPTION OF EXEMPLARY EMBODIMENTS

Figure 1:
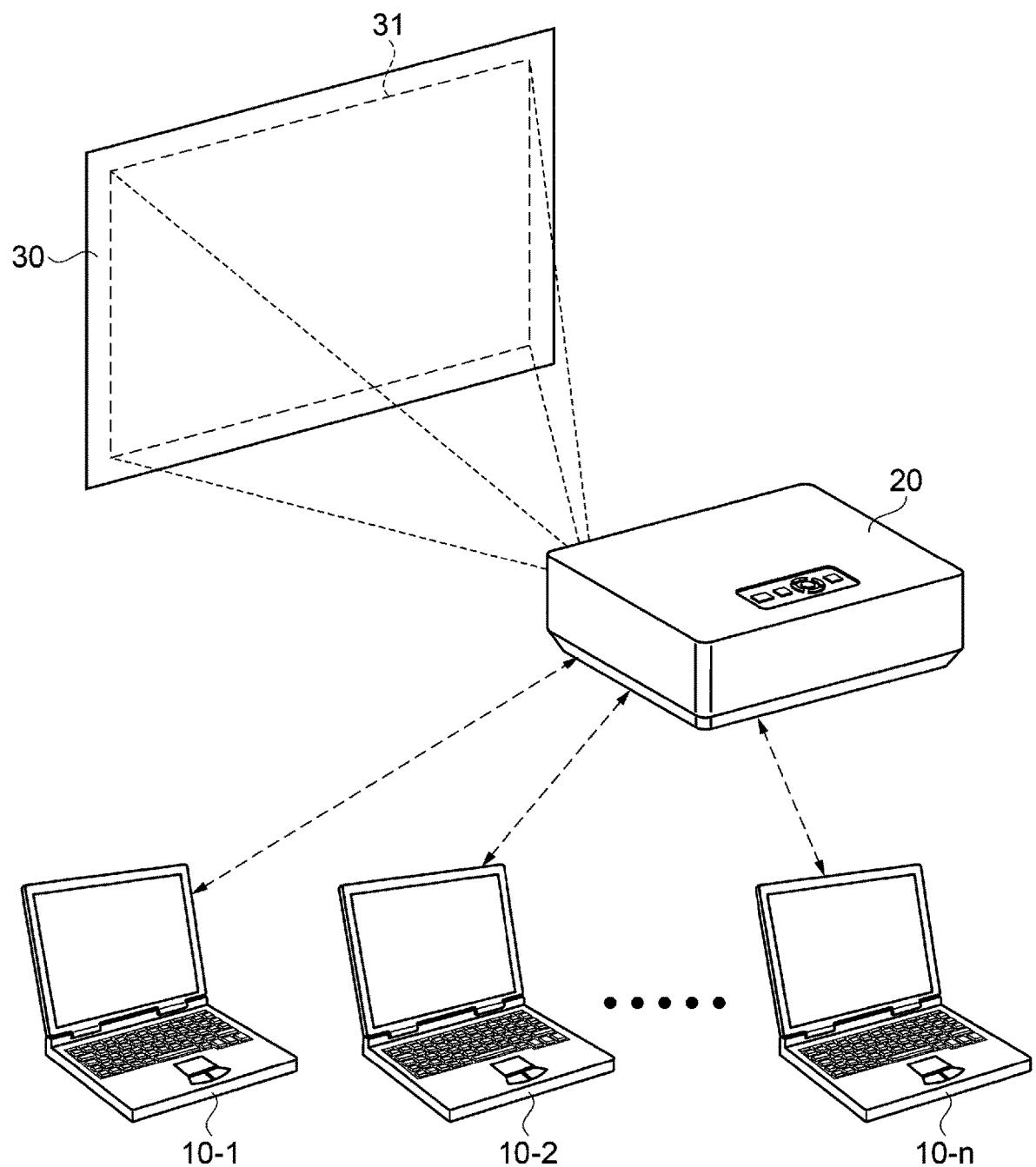
FIG. 1 is a diagrammatic view for describing a display system according to an embodiment.

Embodiments of the present disclosure will be described below with reference to the drawings. In the drawings, the same element or a similar element has the same reference character or a similar reference character, and no redundant description of element will be made. The following embodiment exemplifies a system that embodies the technical idea of the present disclosure and an apparatus used in the system and a method used with the system. The technical idea of the present disclosure is not intended to limit the type and configuration of each apparatus, the network topology, a series of processes, and other factors to those described below. Further, all configurations described in the present embodiment are not necessarily essential configuration requirements of the present disclosure.

Display System

A display system according to the present embodiment includes a plurality of terminals 10-1, 10-2, . . . , 10-n and a display apparatus 20, which displays an image 31 on a screen 30, as shown in FIG. 1. The plurality of terminals 10-1 to 10-n are formed, for example, of a first terminal 10-1, a second terminal 10-2, and an n-th terminal 10-n. The number of plurality of terminals 10-1 to 10-n shown in FIG. 1 is three, but the number of plurality of terminals 10-1 to 10-n may be two or four or more. That is, n is an integer greater than or equal to two.

The plurality of terminals 10-1 to 10-n are each an arbitrary instrument having the function of transmitting image data to the display apparatus 20. The plurality of terminals 10-1 to 10-n are each, for example, a personal computer, a smartphone, a camera, a movie player, a television tuner, or a game console. The present embodiment will be described on the assumption that the plurality of terminals 10-1 to 10-n are by way of example notebook personal computers having the same configuration, as shown in FIG. 1.

The display apparatus 20 displays the image 31 on the screen 30 in accordance with the image data acquired from each of the plurality of terminals 10-1 to 10-n. The display apparatus 20 is, for example, a projector, a liquid crystal display apparatus, a plasma display apparatus, or an organic electroluminescence (EL) display apparatus. The present embodiment will be described on the assumption that the display apparatus 20 is by way of example a projector that displays the image 31 by projecting light on the screen 30, as shown in FIG. 1.

Figure 2:
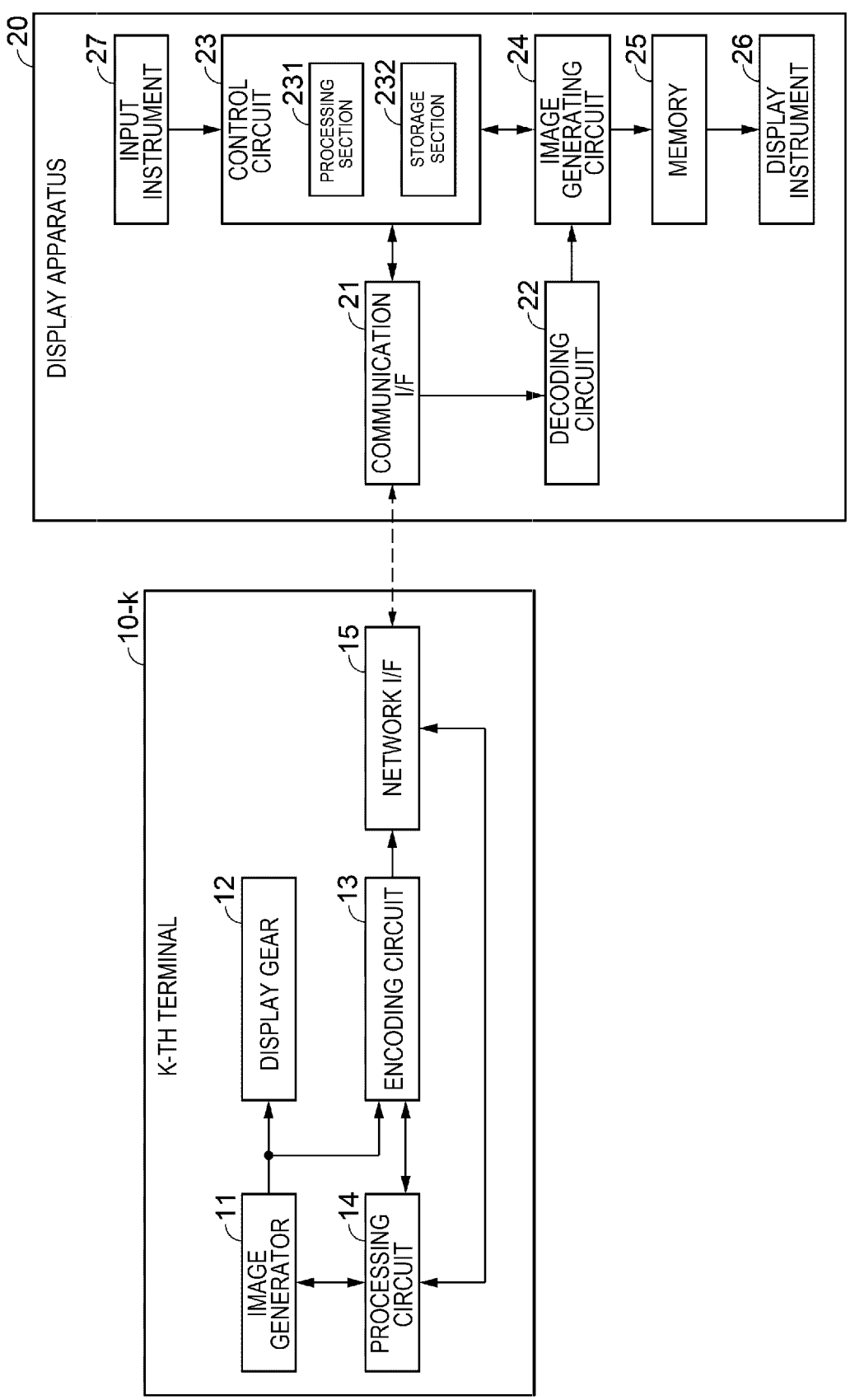
FIG. 2 is a block diagram for describing the configuration of the display system according to the embodiment.

A k-th terminal 10-k includes, for example, an image generator 11, a display gear 12, an encoding circuit 13, a processing circuit 14, and a network interface (I/F) 15, as shown in FIG. 2. The k-th terminal 10-k is any one of the plurality of terminals 10-1 to 10-n. That is, k is an integer greater than or equal to one but smaller than or equal to n. The k-th terminal 10-k will be described as a representative one of the plurality of terminals 10-1 to 10-n in FIG. 2, which only shows the k-th terminal 10-k out of the plurality of terminals 10-1 to 10-n. Description of the other terminals, such as the first terminal 10-1 and the second terminal 10-2, is the same as the description of the k-th terminal 10-k with the ordinal number k replaced with an integer greater than or equal to one but smaller than or equal to n.

The image generator 11 of the k-th terminal 10-k is a circuit that generates k-th raw image data representing a pre-compression k-th image under the control of the processing circuit 14. The processing circuit 14 outputs information that identifies the k-th image to the image generator 11. The image generator 11 may include, for example, a rendering engine, a graphics memory, and other components. The display gear 12 displays the k-th image in accordance with the k-th raw image data generated by the image generator 11. Any of a variety of displays, such as a liquid crystal display and an organic EL display, can be employed as the display gear 12.

The encoding circuit 13 generates k-th transmission data under the control of the processing circuit 14 by encoding the k-th raw image data generated by the image generator 11. The encoding circuit 13 generates the k-th transmission data, for example, by periodically compressing the k-th raw image data at timings specified as a frame rate in accordance with a compression method based on a standard, such as JPEG. The encoding circuit 13 performs information encoding on the k-th raw image data in such a way that the k-th image derived from the k-th transmission data has a parameter set by the processing circuit 14.

The processing circuit 14 sets, for example, at least any one of three types of parameter, the frame rate, the resolution, and the compression rate, as the parameter of the encoding performed by the encoding circuit 13. The encoding parameter is an index that defines the image quality of the k-th image derived from the encoded k-th transmission data. The higher the frame rate, the higher the image quality, whereas the lower the frame rate, the lower the image quality. The higher the resolution, the higher the image quality, whereas the lower the resolution, the lower the image quality. The higher the compression rate, the lower the image quality, whereas the lower the compression rate, the higher the image quality. In the present embodiment, the image quality of the encoded k-th image is defined, for example, as the similarity to the k-th image before encoded and correlates to the size of the k-th transmission data. The parameter set by the processing circuit 14 is determined on the display apparatus 20.

The processing circuit 14 includes, for example, a processor formed, for example, of a central processing unit (CPU) and a storage formed, for example, of a semiconductor memory. The processing circuit 14 performs computation processing necessary for the action of the k-th terminal 10-*k*. The processing circuit 14 achieves functions described in the embodiment, for example, by executing a program stored in the storage. The storage of the processing circuit 14 stores, for example, a program and a variety of data for a series of processes necessary for the action of the k-th terminal 10-*k*. The processing circuit 14 and the encoding circuit 13 may be formed of unified hardware or a plurality of separate pieces of hardware.

The network I/F 15 is communicably coupled to the display apparatus 20 by establishing a communication link between the network I/F 15 and the display apparatus 20. The network I/F 15 transmits the k-th transmission data encoded by the encoding circuit 13 to the display apparatus 20 via the communication link. The communication link between the network I/F 15 and the display apparatus 20 may be a wired or wireless communication link or may be the combination of a wired communication link and a wireless communication link. That is, the network I/F 15 may be directly coupled to the display apparatus 20 or indirectly coupled to the display apparatus 20 via another communication apparatus. The network I/F 15 may include, for example, an antenna via which a wireless signal is transmitted and received, a receptacle into which a plug of a communication cable is inserted, and a communication circuit that processes the signal transmitted via the communication link.

The display apparatus 20 includes, for example, a communication I/F 21, a decoding circuit 22, a control circuit 23, an image generating circuit 24, a memory 25, a display instrument 26, and an input instrument 27. The communication I/F 21 receives transmission data transmitted from each of the plurality of terminals 10-1 to 10-*n*. The communication I/F 21 establishes a communication link between the network I/F 15 of each of the plurality of terminals 10-1 to 10-*n* and the communication I/F 21 under the control of the control circuit 23. The communication I/F 21 may include, for example, an antenna via which a wireless signal is transmitted and received, a receptacle into which a plug of a communication cable is inserted, and a communication circuit that processes the signal transmitted via the communication link.

The communication I/F 21 transmits k-th information containing a parameter determined by the control circuit 23 to the k-th terminal 10-*k*. The k-th information contains the parameter that defines the image quality of the encoded k-th image. The k-th information contains at least any one of the three types of parameter, the frame rate, the resolution, and the compression rate. The communication I/F 21 receives the k-th transmission data transmitted from the k-th terminal 10-*k*. The decoding circuit 22 decodes the k-th transmission data received via the communication I/F 21 to generate k-th image data representing the encoded k-th image.

The control circuit 23 includes, for example, a processing section 231 formed, for example, of a CPU and a storage section 232 formed, for example, of a semiconductor memory. The processing section 231 forms a processor of a computer that performs computation processing necessary for the action of the display apparatus 20. The processing section 231 achieves functions described in the embodiment, for example, by executing a program stored in the storage section 232. The storage section 232 is, for example, a computer readable storage medium that stores, for example, a program and a variety of data for a series of processes necessary for the action of the display apparatus 20. The storage section 232 is not limited to a nonvolatile auxiliary storage and may include a volatile primary storage, such as a register built in the CPU. The control circuit 23 may be formed of unified hardware or a plurality of separate pieces of hardware.

The image generating circuit 24 generates integrated image data from the decoded k-th image data from the decoding circuit 22 and image data generated by the control circuit 23 under the control of the control circuit 23. The integrated image data is image data for displaying the k-th image as a preview image on the screen 30. The image generating circuit 24 may also serve as a circuit that forms the control circuit 23. The image data generated by the control circuit 23 forms, for example, a cursor, a menu, a background, and other objects on the screen 30 and can be achieved in the form of on-screen display (OSD).

The memory 25 is formed, for example, of a graphics memory, such as a video random access memory (VRAM). The memory 25 cyclically stores the integrated image data generated by the image generating circuit 24. The memory 25 successively outputs image data on a display area displayed by the display instrument 26 out of the integrated image data stored in the memory 25 to the display instrument 26. The memory 25, for example, outputs image data on an updated display area to the display instrument 26 whenever the image data on the display area is updated.

The display instrument 26 includes, for example, a display device having a plurality of pixels, such as a liquid crystal panel, and an optical system, such as a light source, a lens, and a mirror. The display device modulates the light emitted from the light source in accordance with the image data on the display area inputted from the memory 25. The display instrument 26 projects the light having traveled via the display device on the screen 30 via the optical system to display the image 31 expressed by the image data on the display area on the screen 30.

For example, the communication I/F 21 receives first transmission data representing a first image from the first terminal 10-1 and second transmission data representing a second image from the second terminal 10-2. In this process, the display instrument 26 displays the first image on the screen 30 based on the first transmission data but does not display the second image on the screen 30 based on the second transmission data.

In this case, the control circuit 23 controls at least one of the first terminal 10-1 and the second terminal 10-2 in such a way that the first transmission data has a larger communication traffic volume than that of the second transmission data. For example, the control circuit 23 transmits first information that defines the image quality of the first image to the first terminal 10-1 via the communication I/F 21 and second information that defines the image quality of the second image to the second terminal 10-2 via the communication I/F 21 to control the first terminal 10-1 and the second terminal 10-2. The image generating circuit 24 generates the integrated image data representing the first and second images mapped in shifted positions based on the first transmission data and the second transmission data. The display instrument 26 displays the first image on the screen 30 based on the integrated image data.

The input instrument 27 accepts a user's operation and outputs a signal according to the user's operation to the control circuit 23. A variety of input instruments can be employed as the input instrument 27, such as push buttons, a touch sensor, and a keyboard, and further a pointing device using a mouse, a touch panel, a digitizer, or a distance measuring sensor. The user can use the input instrument 27 to perform a variety of types of operation on the image 31, for example, scroll the image 31 displayed on the screen 30 and select an arbitrary item from a plurality of items contained in the image 31. For example, the input instrument 27 allows movement of the first and second images, which are mapped in the positions shifted from each other in the integrated image data, relative to a display area 41 in accordance with the user's scroll operation.

Figure 3:
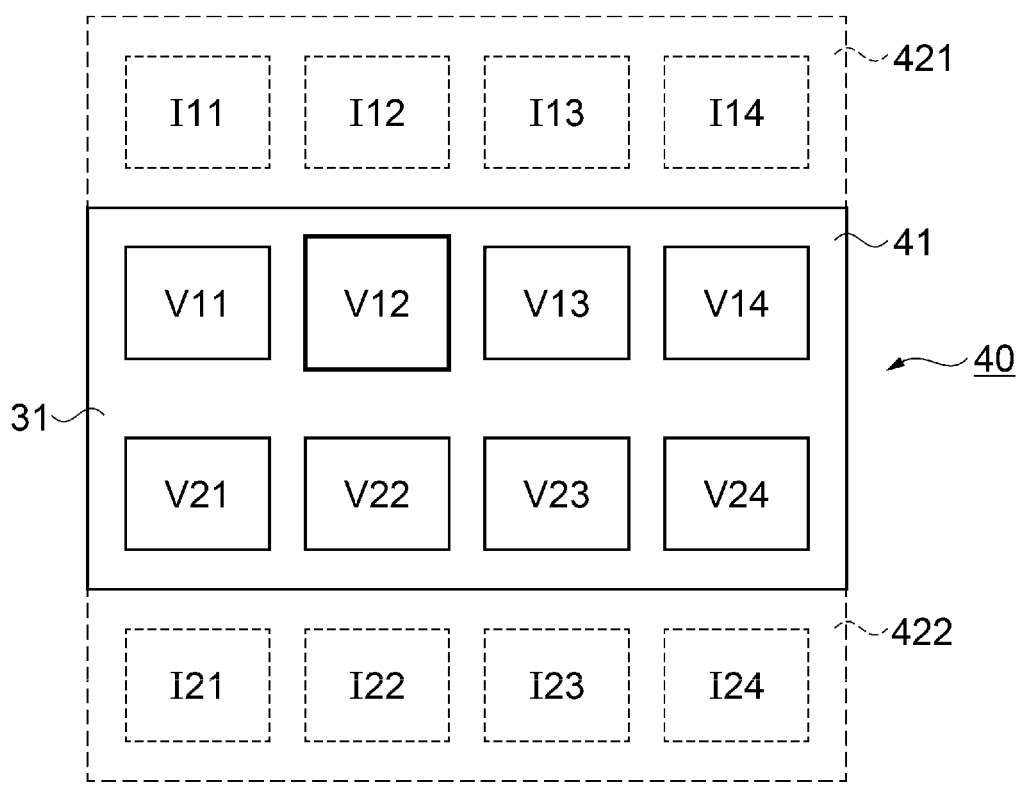
FIG. 3 describes an example of an imaginary integrated image.

The integrated image data generated by the image generating circuit 24 can be described as an imaginary integrated image 40 defined in practice in an address space of the memory 25, as shown in FIG. 3. The integrated image 40 has the display area 41, which is actually displayed on the screen 30 in correspondence with the screen 30, a first buffer area 421 and a second buffer area 422, which are each adjacent to the display area 41. The first buffer area 421 and the second buffer area 422 are each a dummy area that is not displayed on the screen 30. In the example shown in FIG. 3, the first buffer area 421, the display area 41, and the second buffer area 422 are sequentially arranged vertically from above. The integrated image data may be formed of a plurality of layers or a single layer.

In the example shown in FIG. 3, the display area 41 has eight preview area V11 to V14 and V21 to V24 arranged in a 2×4 matrix. The first buffer area 421 has four candidate areas I11 to I14 horizontally arranged in one row. The second buffer area 422 has four candidate areas I21 to I24 horizontally arranged in one row. The eight preview area V11 to V14 and V21 to V24 and the eight candidate areas I11 to I14 and I21 to I24 are arranged in a 4×4 matrix. Sixteen images acquired from 16 terminals contained in the plurality of terminals 10-1 to 10-$n$ are mapped in positions shifted from one another as sixteen preview images in the preview area V11 to V14 and V21 to V24 and the candidate areas I11 to I14 and I21 to I24. That is, the example shown in FIG. 3 means that n or the number of plurality of terminals 10-1 to 10-$n$ coupled to the display apparatus 20 is greater than or equal to sixteen.

For example, when the k-th image is mapped as a preview image in the display area 41, the k-th terminal 10-$k$ uses a reference parameter determined on the display apparatus 20 to encode the k-th raw image data to generate the k-th transmission data. That is, the k-th image mapped in the display area 41 based on the k-th transmission data has a prespecified reference value of at least any one of the three parameters, the frame rate, the resolution, and the compression rate.

The control circuit 23 determines the reference parameter in accordance, for example, with the number of terminals mapped in the display area 41. That is, the reference parameter is so determined that the greater the number of preview images displayed on the screen 30, the lower the image quality. In this process, the control circuit 23 can set an upper limit of the number of preview images displayed on the screen 30. The control circuit 23 can thus ensure that the preview images displayed on the screen 30 are visually recognizable. The control circuit 23 may determine the reference parameter in accordance with the number of terminals mapped in the integrated image 40 or may set a lower limit of the resolution of the preview images mapped in the display area 41. Setting the resolution as the reference parameter to be the resolution of the preview images displayed on the screen allows reduction in the processing load on the image generating circuit 24 that performs the resolution conversion.

In a case where the k-th image is mapped in the first buffer area 421 or the second buffer area 422, the k-th terminal 10-$k$ uses a parameter that allows reduction in size of the encoded k-th transmission data as compared with the case where the reference parameter is used to encode the k-th raw image data. The k-th image mapped in the first buffer area 421 or the second buffer area 422 based on the k-th transmission data has a parameter that causes reduction in the image quality, that is, allows reduction in data size as compared with the reference parameter. In this case, the k-th image has, for example, a lower frame rate and resolution than those of a preview image mapped in the display area 41.

In a case where the k-th image is mapped in the display area 41 and selected via the input instrument 27, the k-th terminal 10-$k$ uses a parameter that causes an increase in size of the encoded k-th transmission data as compared with the case where the reference parameter is used to encode the k-th raw image data. In this case, the k-th image has a parameter that allows improvement in the image quality, that is, causes an increase in data size as compared with the reference parameter. In a case where the k-th image is mapped in the preview area V12 and selected via the input instrument 27, the k-th image is, for example, displayed as an enhanced image on the screen 30 because the k-th image has higher frame rate and resolution than the other preview images, as shown in FIG. 3. In addition, the selected k-th image may be displayed as an image enhanced, for example, by increasing the size, changing the color of a peripheral edge portion, and using other visual effects on the screen 30.

In a case where the k-th image is not mapped in the integrated image 40, the k-th terminal 10-$k$ does not encode the k-th raw image data or transmit the k-th transmission data to the display apparatus 20.

The control circuit 23 determines the k-th information containing a parameter that defines the image quality of the k-th image in accordance with the state in which the k-th image is displayed, that is, the position of the k-th image in the integrated image data and transmits the k-th information to the k-th terminal 10-$k$ to change the size of the k-th transmission data, that is, the communication traffic volume of k-th transmission data. The k-th terminal 10-$k$ uses the parameter contained in the k-th information to encode the k-th raw image data to generate the k-th transmission data. The types of parameter determined for the plurality of terminals 10-1 to 10-$n$ can be the same. The display apparatus 20 can thus control the plurality of terminals 10-1 to 10-$n$ in such a way that the communication traffic volumes of transmission data, that is, the data sizes are determined by the size relationship described above.

In the state shown in FIG. 3, the image 31 containing eight preview images mapped in the preview areas V11 to V14 and V21 to V24 is displayed on the screen 30. When the image 31 is scrolled upward by the amount corresponding to one row from the state shown in FIG. 3 via the input instrument 27, the four preview images mapped in the candidate areas I11 to I14 and the four preview images mapped in the preview areas V11 to V14 are newly mapped in the display area 41 and displayed on the screen 30. In the state shown in FIG. 3, the memory 25 stores in advance image data on the four preview images mapped in the candidate areas I11 to I14. The display apparatus 20 can therefore shorten a delay period due to the change in the preview images that occurs in the scroll-up operation and can smoothly scroll the image 31.

Similarly, when the image 31 is scrolled downward by the amount corresponding to one row from the state shown in FIG. 3, the four preview images mapped in the preview areas V21 to V24 and the four preview images mapped in the candidate areas I21 to I24 are displayed on the screen 30.

Immediately before the scroll operation, the memory 25 stores in advance image data on the four preview images mapped in the candidate areas I21 to I24. The display apparatus 20 can therefore shorten a delay period due to the change in the preview images on the screen 30 and can smoothly scroll the image 31 accordingly.

Method for Controlling Display System

Figure 4:
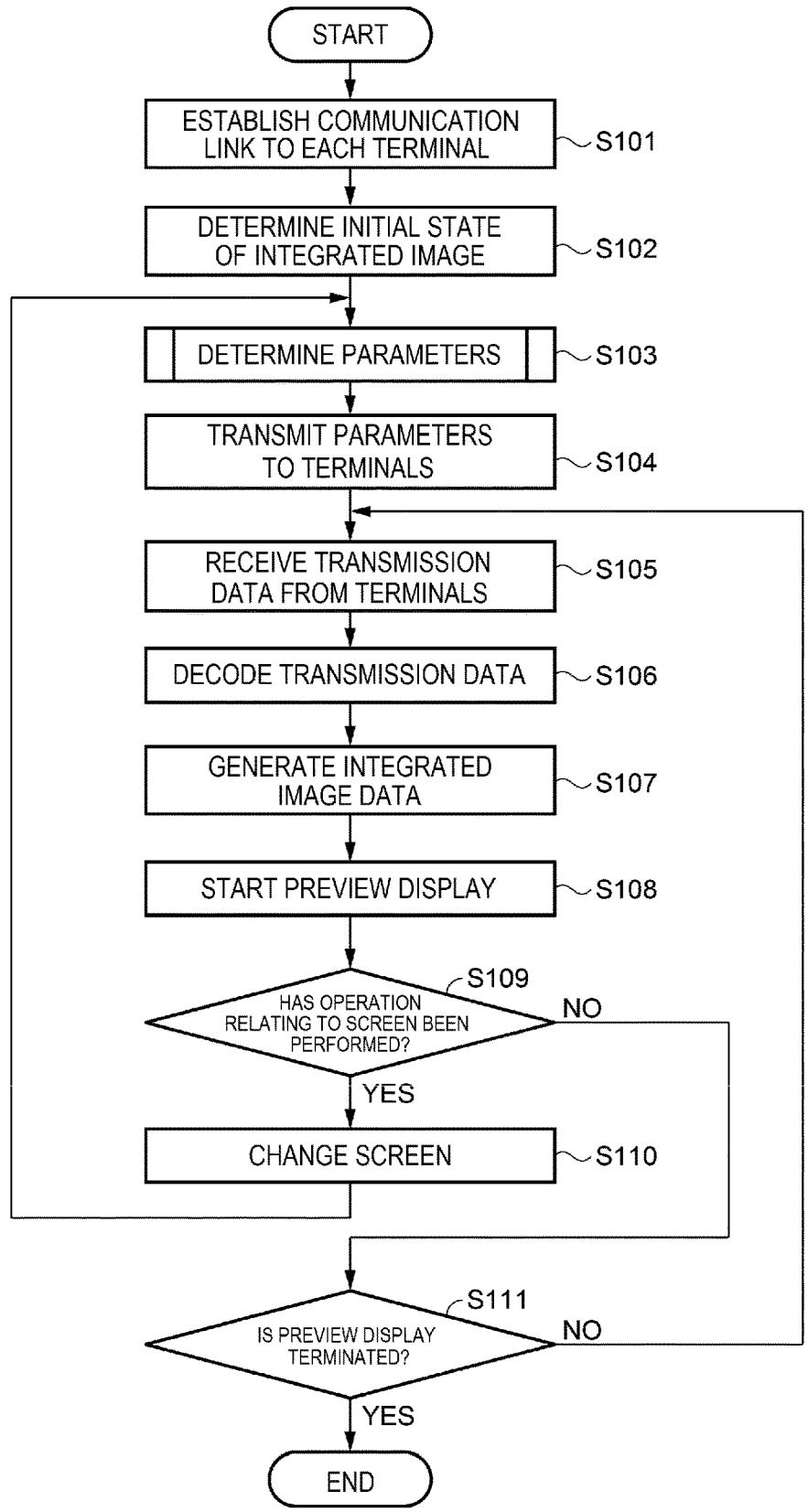
FIG. 4 is a flowchart for describing the action of a display apparatus.
Figure 5:
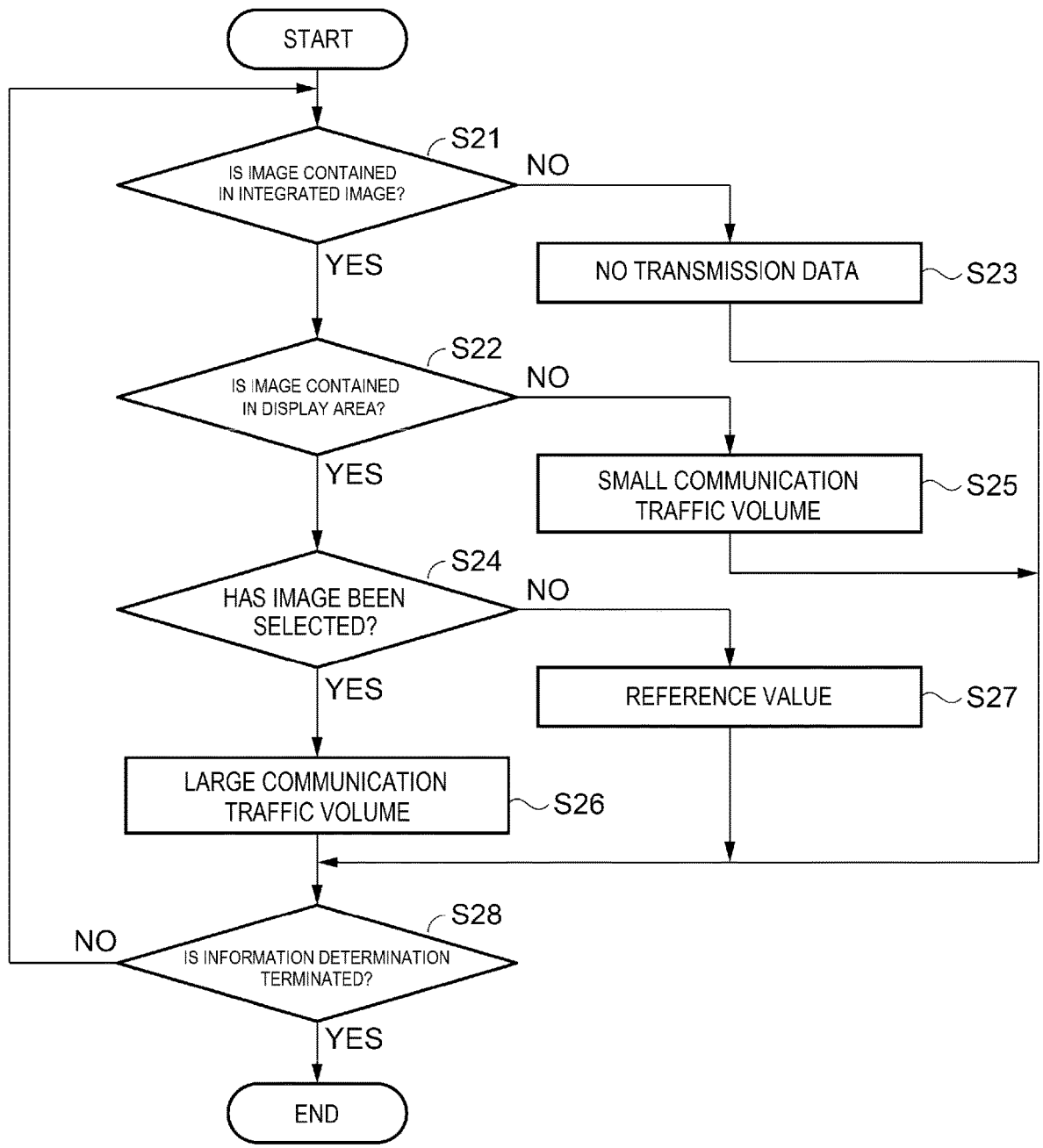
FIG. 5 is a flowchart for describing a method for allowing the display apparatus to determine a parameter.
Figure 6:
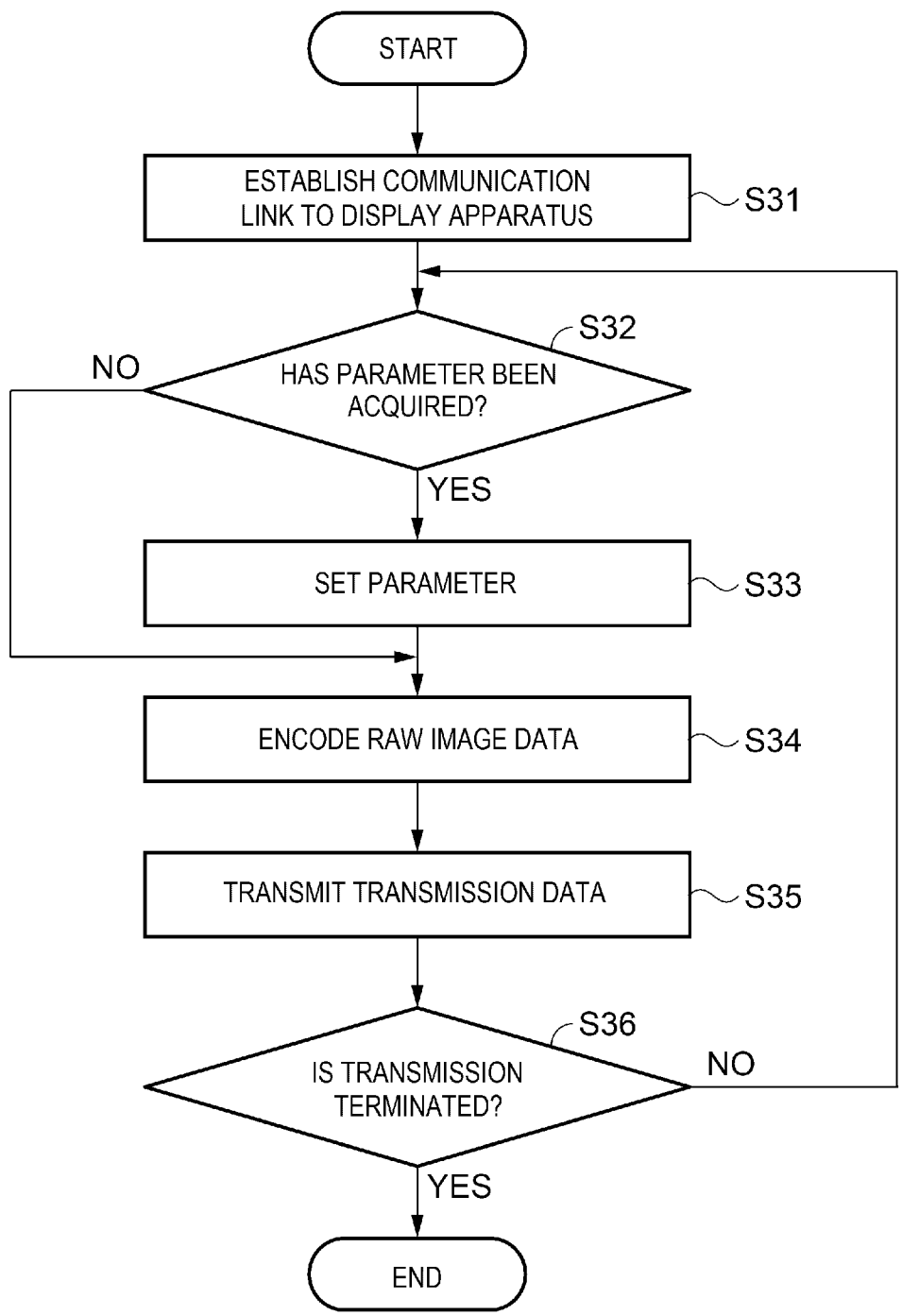
FIG. 6 is a flowchart for describing the action of a terminal.

An example of the actions of the plurality of terminals 10-1 to 10-$n$ and the display apparatus 20 will be described as a method for controlling the display system according to the present embodiment with reference to the flowcharts of FIGS. 4 to 6.

Action of Display Apparatus

An example of the action of the display apparatus 20 will first be described with reference to the flowchart of FIG. 4. In step S101, the communication I/F 21 establishes the communication link between the communication I/F 21 and each of the plurality of terminals 10-1 to 10-$n$ under the control of the control circuit 23. Specifically, the communication I/F 21 cooperates with the network I/F 15 of each of the plurality of terminals 10-1 to 10-$n$ in accordance with a predetermined protocol to establish the communication link.

In step S102, the control circuit 23 determines an initial state of the integrated image 40. For example, the control circuit 23 executes a program installed in advance to determine, for example, terminals that output preview images mapped in the integrated image 40 out of the plurality of terminals 10-1 to 10-$n$ and the arrangement of the preview images in the integrated image 40. The control circuit 23 can determine the initial state, for example, by mapping identifiers corresponding to the terminals 10-1 to 10-$n$ in a predetermined order in the preview areas V11 to V14 and V21 to V24 and the candidate areas I11 to I14 and I21 to I24.

In step S103, the control circuit 23 determines a parameter that defines the image quality of the preview image corresponding to each of the plurality of terminals 10-1 to 10-$n$. The control circuit 23 generates a plurality of pieces of first to n-th information containing the determined parameters and corresponding to the plurality of terminals 10-1 to 10-$n$, respectively.

In step S104, the control circuit 23 transmits the pieces of information generated in step S103 to the corresponding terminals 10-1 to 10-$n$. That is, the control circuit 23 transmits the k-th information containing the parameter that defines the image quality of the k-th image to the k-th terminal 10-$k$ via the communication I/F 21. The pieces of information transmitted in step S104 is received by the terminals 10-1 to 10-$n$. In the case where the k-th image is contained 40 as a preview image in the integrated image, the k-th terminal 10-$k$ transmits the k-th transmission data encoded by using the parameter contained in the k-th information to the display apparatus 20.

In step S105, the communication I/F 21 receives the transmission data transmitted from the terminals in accordance with the pieces of information transmitted in step S104. That is, when the k-th image is contained as a preview image in the integrated image 40, the communication I/F 21 receives the k-th transmission data encoded by using the parameter contained in the k-th information and transmitted from the k-th terminal 10-$k$.

In step S106, the decoding circuit 22 decodes the transmission data received via the communication I/F 21 in step S105 to generate image data. That is, the decoding circuit 22 decodes the k-th transmission data transmitted from the k-th terminal 10-$k$ to acquire the k-th image data representing the decoded k-th image.

In step S107, the image generating circuit 24 generates the integrated image data from the plurality of sets of image data acquired in step S106. The integrated image data may contain image data generated by the control circuit 23. In step S107 in the first round, the image generating circuit 24 generates integrated image data representing the initial-state integrated image 40 determined in step S102. In step S107 afterwards, the image generating circuit 24 can change the integrated image data in accordance with operation performed on the image 31 via the input instrument 27.

In step S108, the display instrument 26 displays the image 31 derived from image data corresponding to the display area 41 out of the integrated image data generated in step S107 on the screen 30. In step S018 in the first round, the display instrument 26 thus starts preview display in which images displayed in the plurality of terminals 10-1 to 10-$n$ are selectively displayed on the screen 30.

In step S109, the control circuit 23 evaluates whether or not operation of changing the image 31 displayed on the screen 30 has been performed via the input instrument 27. In a case where the result of the evaluation shows that operation has been performed, the control circuit 23 proceeds to the process in step S110, whereas when the result of the evaluation shows that no operation has been performed, the control circuit 23 proceeds to the process in step S111. The operation of changing the image 31 is not limited to operation performed via the input instrument 27 and may instead be automatically performed by the control circuit 23.

In step S110, the control circuit 23 controls the image generating circuit 24 in such a way that the generated integrated image data is changed in accordance with the operation performed in step 109. The image generating circuit 24 changes the integrated image data under the control of the control circuit 23 to generate the image 31 scrolled in accordance with the operation or generate and display an enhanced preview image. The content in the memory 25 is therefore changed, and the image 31 displayed on the screen 30 is changed accordingly. Having controlled the image generating circuit 24 in step S110, the control circuit 23 returns to the process in step S103.

In step S111, the control circuit 23 evaluates whether or not the preview display performed on the display instrument 26 is terminated. For example, when operation of determining a preview image displayed on the screen 30 and selected via the input instrument 27 is performed via the input instrument 27, the control circuit 23 determines to terminate the preview display. For example, when the preview image on which the determining operation has been performed is the k-th image, the control circuit 23 enlarges and displays the k-th image having higher image quality than that of the preview image. In the case where the result of the evaluation shows that the preview display is terminated, the control circuit 23 terminates the overall processes, whereas when the result of the evaluation shows that the preview display is not terminated, the control circuit 23 returns to the process in step S105.

Determination of First to n-Th Information

A method for determining the first to n-th information to be transmitted to the plurality of terminals 10-1 to 10-$n$ will next be described with reference to the flowchart of FIG. 5 as a detailed example of the process in step S103 out of the series of processes shown in the flowchart of FIG. 4.

In step S21, the control circuit 23 evaluates whether or not the k-th image acquired from the k-th terminal 10-$k$, which is any of the plurality of terminals 10-1 to 10-$n$, is an image contained in the integrated image 40. In a case where the k-th image is contained in the integrated image 40, the control circuit 23 proceeds to the process in step S22, whereas when the k-th image is not contained in the integrated image 40, the control circuit 23 proceeds to the process in step S23.

In step S22, the control circuit 23 evaluates whether or not the k-th image is contained in the display area 41. In a case where the k-th image is contained in the display area 41, the control circuit 23 proceeds to the process in step S24. In a case where the k-th image is not contained in the display area 41, that is, when the k-th image is contained in the first buffer area 421 or the second buffer area 422, the control circuit 23 proceeds to the process in step S25.

In step S23, the control circuit 23 determines the k-th information in such a way that the communication traffic volume of the k-th transmission data is zero, that is, the k-th terminal 10-$k$ transmits no k-th transmission data to the display apparatus 20. In this case, the k-th information may contain a parameter that is a zero frame rate or zero resolution, an instruction of termination of the transmission of the k-th transmission data, and other pieces of information. Having determined the k-th information in step S23, the control circuit 23 proceeds to the process in step S28.

In step S24, the control circuit 23 evaluates whether or not the k-th image contained in the display area 41 has been selected via the input instrument 27. In a case where the k-th image has been selected, the control circuit 23 proceeds to the process in step S26, whereas when the k-th image has not been selected, the control circuit 23 proceeds to the process in step S27.

In step S25, the control circuit 23 determines the k-th information in such a way that the communication traffic volume of the k-th transmission data representing the k-th image contained in the first buffer area 421 or the second buffer area 422 is smaller than the communication traffic volume of a preview image contained in the display area 41. That is, the k-th information is so determined that the k-th image having the same content as that of a preview image in the display area 41 has image quality lower than that of the preview image in the display area 41. Having determined the k-th information in step S25, the control circuit 23 proceeds to the process in step S28.

In step S26, the control circuit 23 determines the k-th information in such a way that the communication traffic volume of the k-th transmission data representing the k-th image contained in the display area 41 and selected via the input instrument 27 is greater than the communication traffic volume of the other preview images contained in the display area 41. That is, the k-th information is so determined that the k-th image having the same content as those of the other preview images in the display area 41 has image quality higher than those of the other preview images in the display area 41. Having determined the k-th information in step S26, the control circuit 23 proceeds to the process in step S28.

In step S27, the control circuit 23 determines the k-th information in such a way that the communication traffic volume of the k-th transmission data representing the k-th image that is contained in the display area 41 but has not been selected via the input instrument 27 has the reference value. That is, the k-th information is so determined that the image quality of the k-th image has a reference value. Having determined the k-th information in step S27, the control circuit 23 proceeds to the process in step S28.

In step S28, the control circuit 23 evaluates whether or not all the first to n-th information have been determined. In a case where the result of the evaluation shows that the determination has been completed, the control circuit 23 terminates the overall processes, whereas when the result of the evaluation shows that the determination has not been completed, the control circuit 23 returns to the process in step S21. The control circuit 23, for example, sets k at one in step S21 in the first round, increments k whenever step S21 is carried out, and determines that the determination has not been completed unless k reaches n.

Action of Terminals

An example of the action of the k-th terminal 10-$k$ corresponding to the k-th image mapped in the integrated image data out of the plurality of terminals 10-1 to 10-$n$ will next be described with reference to the flowchart of FIG. 6.

In step S31, the network I/F 15 of the k-th terminal 10-$k$ cooperates with the communication I/F 21 of the display apparatus 20 under the control of the processing circuit 14 to establish the communication link between the k-th terminal and the display apparatus 20.

In step S32, the processing circuit 14 evaluates whether or not the network I/F 15 has acquired the parameter contained in the k-th information received from the display apparatus 20. In a case where the parameter has been acquired, the processing circuit 14 proceeds to the process in step S33, whereas when no parameter has been acquired, the processing circuit 14 proceeds to the process in step S34.

In step S33, the processing circuit 14 sets the parameter acquired in step S32 as a parameter used by the encoding circuit 13 to perform encoding. The parameter includes at least any one of the three types of parameter, the frame rate, the resolution, and the compression rate.

In step S34, the encoding circuit 13 uses the parameter set in advance to encode the k-th raw image data to generate the k-th transmission data. For example, when the parameter has been acquired in step S32, the encoding circuit 13 uses the parameter set in step S33 to encode the k-th raw image data, whereas when no parameter has been acquired in step S32, the encoding circuit 13 uses a prespecified initial parameter to encode the k-th raw image data.

In step S35, the communication I/F 21 transmits the k-th transmission data generated in step S34 to the display apparatus 20 under the control of the processing circuit 14. As described above, the k-th terminal 10-$k$ can change the communication traffic volume of the k-th transmission data under the control of the display apparatus 20. The display apparatus 20 displays a preview image on the screen 30 based on the received k-th transmission data.

In step S36, the processing circuit 14 evaluates whether or not the transmission of the k-th transmission data for the preview display is terminated. In a case where the transmission of the k-th transmission data is terminated, the processing circuit 14 terminates the overall processes, whereas when the transmission of the k-th transmission data is not terminated, the processing circuit 14 returns to the process in step S32.

For example, a situation in which the first image is mapped in the display area 41 and the second image is mapped in the first buffer area 421 in step S102 means that the first image is displayed on the screen 30 but the second image is not displayed on the screen 30. At this point, since the priority of a preview image displayed on the screen 30 is higher than the priority of a preview image that is not displayed on the screen 30, the control circuit 23 controls at least any of the first terminal 10-1 and the second terminal 10-2 in such a way that the first transmission data has a larger communication traffic volume than the second transmission data. For example, the display apparatus 20 may transmit the second information only to the second terminal 10-2. In this case, the parameter contained in the second information is so determined that the communication traffic volume of the second transmission data is smaller than the communication traffic volume of the first transmission data generated based on an initial parameter specified by the first terminal 10-1. As described above, the control circuit 23 can control the terminals in such a way that the communication traffic volume of transmission data correlates to preset priority to improve the band use efficiency.

In a case where only the first image is selected out of the first image and a third image displayed on the screen 30 via the input instrument 27, the priority of the first image is higher than that of the third image. The control circuit 23 therefore controls at least one of the first terminal 10-1 and the third terminal 10-3 in such a way that the first transmission data has a lager communication traffic volume than third transmission data.

In a case where the second image is mapped in the first buffer area 421 or the second buffer area 422 and a fourth image is not mapped in the integrated image data, the priority of the second image is higher than that of the fourth image. The control circuit 23 therefore controls at least one of the second terminal 10-2 and the fourth terminal 10-4 in such a way that the second transmission data has a lager communication traffic volume than fourth transmission data. Specifically, the control circuit 23 can change the communication traffic volume of the fourth transmission data to zero. As described above, when the k-th image is not mapped in the integrated image data, the control circuit 23 transmits an instruction of termination of the transmission of the k-th transmission data to the k-th terminal 10-k.

As described above, the display system according to the present embodiment can improve the network band use efficiency by terminating transmission of data from a terminal that is not mapped in the integrated image data. Further, the display system can further improve the band use efficiency and improve the image quality of a preview image by changing the communication traffic volume of transmission data in accordance with the state in which the preview image is displayed. Moreover, in a scene in which the image 31 is scrolled, the display system can shorten a delay period due to a change in a preview image on the screen 30 and can therefore smoothly scroll the image 31.

Variations

Figure 7:
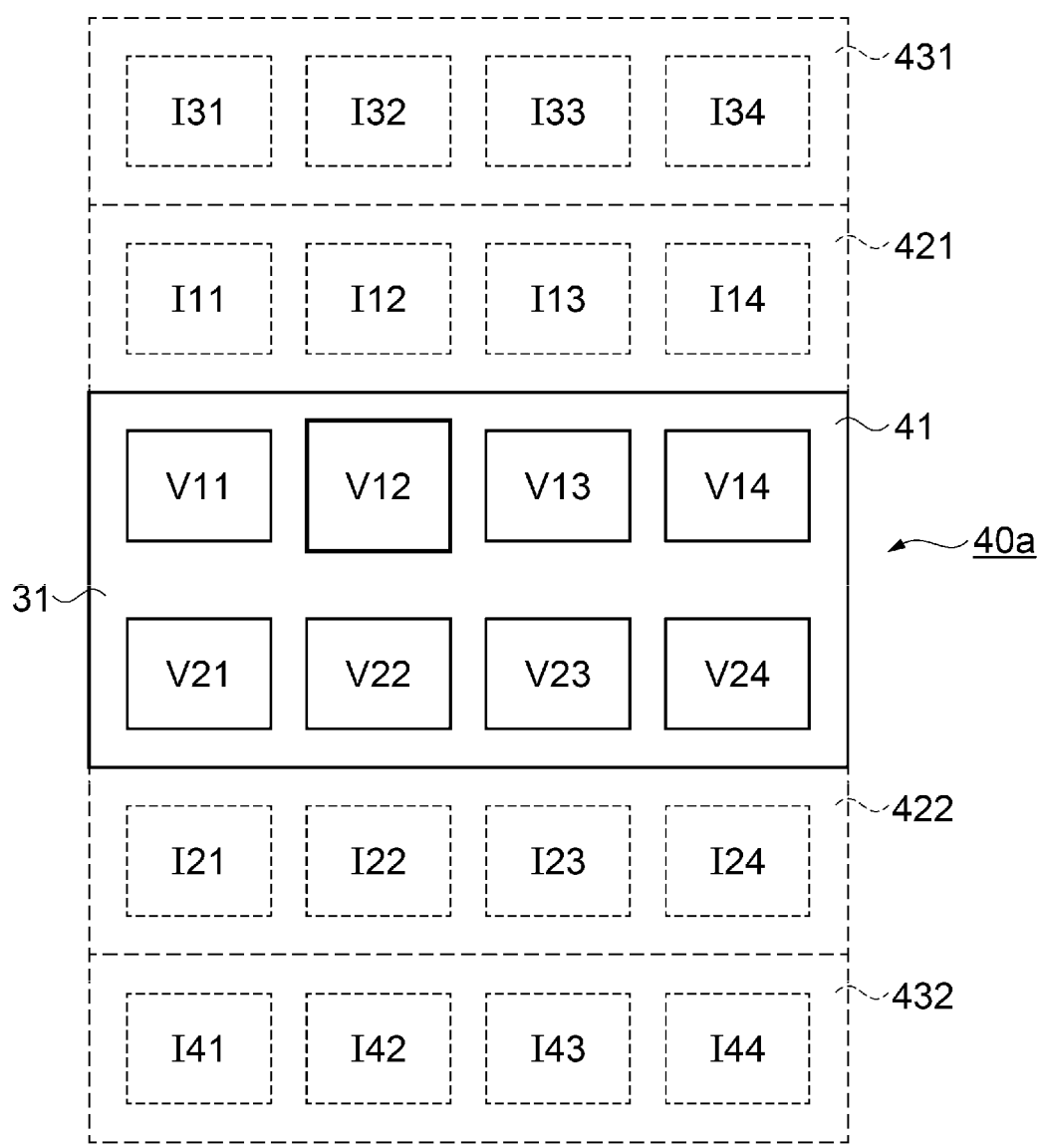
FIG. 7 describes an example of an imaginary integrated image in a variation of the embodiment.

In a display system according to a variation of the present embodiment, an integrated image 40a has a third buffer area 431 and a fourth buffer area 432 in addition to the display area 41, the first buffer area 421, and the second buffer area 422, as shown in FIG. 7. The integrated image 40a is successively generated by the image generating circuit 24 and derived from the integrated image data cyclically stored in the memory 25. In the example shown in FIG. 7, the third buffer area 431, the first buffer area 421, the display area 41, the second buffer area 422, and the fourth buffer area 432 are sequentially arranged vertically from above. The third buffer area 431 has four candidate areas I31 to I34 horizontally arranged in one row. The fourth buffer area 432 has four candidate areas I41 to I44 horizontally arranged in one row.

In a case where the k-th image is mapped in the third buffer area 431 or the fourth buffer area 432, the k-th terminal 10-k transmits the k-th transmission data having a smaller communication traffic volume than when the k-th image is mapped in the first buffer area 421 and the second buffer area 422 to the display apparatus 20. That is, for example, a preview image mapped in the third buffer area 431 has lower image quality than a preview image mapped in the first buffer area 421. Segmenting the areas adjacent to the display area 41 in the integrated image 40a in terms of the distance from the display area 41 as described above allows formation of a multi-stage buffer area. As a result, the speed at which the image 31 is scrolled can be improved, and the delay period due to a change in a preview image on the screen 30 can be further shortened.

OTHER EMBODIMENTS

The embodiment has been described above, and the present disclosure is not limited to the above description. The configuration of each portion may be replaced with an arbitrary configuration having the same function, and an arbitrary configuration in the embodiment may be omitted or added to the extent that the change falls within the technical scope of the present disclosure. The disclosure of the embodiment thus allows a person skilled in the art to conceive of alternate embodiments.

For example, in the embodiment having been already described, the direction of the scrolling performed via the input instrument 27 is not limited to the vertical direction and may instead be the horizontal direction or an oblique direction. That is, the areas adjacent to the display area 41 may be adjacent to any edge of the integrated image 40.

In addition to the above, the present disclosure, of course, encompasses a variety of embodiments that are not described in the above description, such as a configuration that is the combination of any of the configurations described above. The technical scope of the present disclosure is specified only by the inventive specific items according to the appended claims that are reasonably derived from the above description.

Contents derived from the embodiment described above will be described below as aspects.

A first aspect relates to a method for controlling a display system including a first terminal, a second terminal, and a display apparatus that displays an image on a screen. First transmission data representing a first image is transmitted from the first terminal to the display apparatus. Second transmission data representing a second image is transmitted from the second terminal to the display apparatus. In a case where the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

According to the first aspect, the network band use efficiency can be improved irrespective of the number of terminals, whereby the image quality of an image displayed on the screen can be improved.

A second aspect is based on the first aspect, and the display apparatus controls the first and second terminals by transmitting first information that defines the image quality of the first image to the first terminal and transmitting second information that defines the image quality of the second image to the second terminal.

According to the second aspect, transmitting the first information and the second information allows the terminals to define the qualities of the first and second images. Therefore, when the display apparatus acquires the second image in advance and displays the second image, the display apparatus can smoothly display the second image.

A third aspect is based on the second aspect, and the first information and the second information each contain at least one of three types of parameter, the frame rate, the resolution, and the compression rate.

According to the third aspect, in which the first information and the second information each contain a parameter that defines the image quality, the communication traffic volume of each of the first transmission data and the second transmission data can be changed.

A fourth aspect is based on any of the first to third aspects, and the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

According to the fourth aspect, in which the display apparatus generates the integrated image data in advance, the content displayed on the screen can be smoothly changed when the first and second images are moved relative to the display area.

A fifth aspect is based on the fourth aspect, and the display apparatus moves the first and second images relative to the display area in according with the user's operation.

According to the fifth aspect, the display apparatus accepts the user's operation and can then smoothly change the content displayed on the screen in accordance with the user's operation.

A sixth aspect relates to a display system including a first terminal, a second terminal, and a display apparatus that displays an image on a screen. The first terminal transmits first transmission data representing a first image to the display apparatus. The second terminal transmits second transmission data representing a second image to the display apparatus. In a case where the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

According to the sixth aspect, the network band use efficiency can be improved irrespective of the number of terminals, whereby the image quality of an image displayed on the screen can be improved.

A seventh aspect is based on the sixth aspect, and the display apparatus controls the first and second terminals by transmitting first information that defines the image quality of the first image to the first terminal and transmitting second information that defines the image quality of the second image to the second terminal.

According to the seventh aspect, transmitting the first information and the second information allows the terminals to define the qualities of the first and second images. Therefore, when the display apparatus acquires the second image in advance and displays the second image, the display apparatus can smoothly display the second image.

An eighth aspect is based on the seventh aspect, and the first information and the second information each contain at least one of three types of parameter, the frame rate, the resolution, and the compression rate.

According to the eighth aspect, in which the first information and the second information each contain a parameter that defines the image quality, the communication traffic volume of each of the first transmission data and the second transmission data can be changed.

A ninth aspect is based on any of the sixth to eighth aspects, and the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

According to the ninth aspect, in which the display apparatus generates the integrated image data in advance, the content displayed on the screen can be smoothly changed when the first and second images are moved relative to the display area.

A tenth aspect is based on the ninth aspect, and the display apparatus moves the first and second images relative to the display area in according with the user's operation.

According to the tenth aspect, the display apparatus accepts the user's operation and can then smoothly change the content displayed on the screen in accordance with the user's operation.

An eleventh aspect relates to a display apparatus including a display instrument that displays an image on a screen, a communication interface that receives first transmission data transmitted from a first terminal and representing a first image and second transmission data transmitted from a second terminal and representing a second image, and a control circuit that controls at least one of the first and second terminals in such a way that the first transmission data has a larger communication traffic volume than the second transmission data when the first image is displayed on the screen based on the first transmission data but the second image is not displayed on the screen based on the second transmission data.

According to the eleventh aspect, the network band use efficiency can be improved irrespective of the number of terminals, whereby the image quality of an image displayed on the screen can be improved.

A twelfth aspect is based on the eleventh aspect, and the control circuit controls the first and second terminals by transmitting first information that defines the image quality of the first image to the first terminal via the communication interface and transmitting second information that defines the image quality of the second image to the second terminal via the communication interface.

According to the twelfth aspect, transmitting the first information and the second information allows the terminals to define the qualities of the first and second images. Therefore, when the display apparatus acquires the second image in advance and displays the second image, the display apparatus can smoothly display the second image.

A thirteenth aspect is based on the twelfth aspect, and the first information and the second information each contain at least one of three types of parameter, the frame rate, the resolution, and the compression rate.

According to the thirteenth aspect, in which the first information and the second information each contain a parameter that defines the image quality, the communication traffic volume of each of the first transmission data and the second transmission data can be changed.

A fourteenth aspect is based on any of the eleventh to thirteenth aspects, and the display apparatus further includes an image generating circuit that generates integrated image data based on the first transmission data and the second transmission data, part of the integrated image data defining a display area displayed in correspondence with the screen, and the integrated image data representing the first and second images mapped in positions shifted from each other, and the display instrument displays the first image on the screen based on the integrated image data.

According to the fourteenth aspect, in which the integrated image data is generated in advance, the content displayed on the screen can be smoothly changed when the first and second images are moved relative to the display area.

A fifteenth aspect is based on the fourteenth aspect, and the display apparatus further includes an input instrument that accepts the user's operation, and the control circuit moves the first and second images relative to the display area in accordance with the operation.

According to the fifteenth aspect, the display apparatus accepts the user's operation and can then smoothly change the content displayed on the screen in accordance with the user's operation.

What is claimed is:

1. A method for controlling a display system including a first terminal, a second terminal, and a display apparatus that displays an image on a screen, the method comprising:
   transmitting first transmission data representing a first image from the first terminal to the display apparatus; and
   transmitting second transmission data representing a second image from the second terminal to the display apparatus,
   wherein when the display apparatus displays the first image on the screen based on the first transmission data but does not display the second image on the screen based on the second transmission data, the display apparatus controls at least one of the first and second terminals in such a way that the first transmission data has a larger communication traffic volume than the second transmission data.

2. The method for controlling a display system according to claim 1, wherein the display apparatus controls the first and second terminals by transmitting first information that defines an image quality of the first image to the first terminal and transmitting second information that defines an image quality of the second image to the second terminal.

3. The method for controlling a display system according to claim 2, wherein the first information and the second information each contain at least one of three types of parameter, a frame rate, resolution, and a compression rate.

4. The method for controlling a display system according to claim 1, wherein the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

5. The method for controlling a display system according to claim 4, wherein the display apparatus moves the first and second images relative to the display area in according with a user's operation.

6. A display system comprising: a first terminal; a second terminal; and a display apparatus that displays an image on a screen,
   wherein the first terminal transmits first transmission data representing a first image to the display apparatus,
   the second terminal transmits second transmission data representing a second image to the display apparatus, and
   when the display apparatus displays the first image on the screen based on the first transmission data but does not display the second image on the screen based on the second transmission data, the display apparatus controls at least one of the first and second terminals in such away that the first transmission data has a larger communication traffic volume than the second transmission data.

7. The display system according to claim 6, wherein the display apparatus controls the first and second terminals by transmitting first information that defines an image quality of the first image to the first terminal and transmitting second information that defines an image quality of the second image to the second terminal.

8. The display system according to claim 7, wherein the first information and the second information each contain at least one of three types of parameter, a frame rate, resolution, and a compression rate.

9. The display system according to claim 6, wherein the display apparatus generates integrated image data based on the first transmission data and the second transmission data, part of the integrated image data defining a display area displayed in correspondence with the screen, and the integrated image data representing the first and second images mapped in positions shifted from each other, and the display apparatus displays the first image on the screen based on the integrated image data.

10. The display system according to claim 9, wherein the display apparatus moves the first and second images relative to the display area in according with a user's operation.

11. A display apparatus comprising:
    a display instrument that displays an image on a screen;
    a communication interface that receives first transmission data transmitted from a first terminal and representing a first image and second transmission data transmitted from a second terminal and representing a second image; and
    a control circuit that controls at least one of the first and second terminals in such a way that the first transmission data has a larger communication traffic volume than the second transmission data when the first image is displayed on the screen based on the first transmission data but the second image is not displayed on the screen based on the second transmission data.

12. The display apparatus according to claim 11, wherein the control circuit controls the first and second terminals by transmitting first information that defines an image quality of the first image to the first terminal via the communication interface and transmitting second information that defines an image quality of the second image to the second terminal via the communication interface.

13. The display apparatus according to claim 12, wherein the first information and the second information each contain at least one of three types of parameter, a frame rate, resolution, and a compression rate.

14. The display apparatus according to claim 11, further comprising an image generating circuit that generates integrated image data based on the first transmission data and the second transmission data, part of the integrated image data defining a display area displayed in correspondence with the screen, and the integrated image data representing the first and second images mapped in positions shifted from each other,
    wherein the display instrument displays the first image on the screen based on the integrated image data.

15. The display apparatus according to claim 14, further comprising an input instrument that accepts a user's operation, wherein the control circuit moves the first and second images relative to the display area in accordance with the operation.

* * * * *